(12) United States Patent  
Muenter (10) Patent No.: US 7,405,814 B2
(45) Date of Patent: Jul. 29, 2008

(54) FREQUENCY MULTIPLEXED, MULTIPLE CHANNEL HETERODYNE INTERFEROMETER

(75) Inventor: Steven E. Muenter, Van Nuys, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/613,028

(22) Filed: Dec. 19, 2006

(65) Prior Publication Data

US 2008/0144041 A1    Jun. 19, 2008

(51) Int. Cl.
*G01P 3/36*    (2006.01)
(52) U.S. Cl. .................................... 356/28.5
(58) Field of Classification Search ....... 356/3.01–3.15, 356/4.01–4.1, 5.01–5.15, 6–22, 28, 28.5
See application file for complete search history.

(56) References Cited

U.S. PATENT DOCUMENTS 5,317,376 A * 5/1994 Amzajerdian et al. ...... 356/28.5
5,549,114 A * 8/1996 Petersen et al. ............. 600/504
6,972,846 B2 * 12/2005 Lal et al. ..................... 356/486

OTHER PUBLICATIONS

LS110A-XY 1.06HF Dual Axis AO Deflector Specification Sheets, 2002.

* cited by examiner

*Primary Examiner*—Thomas H. Tarcza
*Assistant Examiner*—Luke D Ratcliffe
(74) *Attorney, Agent, or Firm*—Canady & Lortz LLP; Bradley K. Lortz (57) ABSTRACT

A novel technique using an acousto-optic modulator (AOM) as part of a heterodyne interferometer which measures optical path differences between a test signal and a reference signal is disclosed. An array of distinct frequencies are used to drive the AOM, yielding a spatially dispersed array of frequency-shifted subaperture beams of the test signal which are interfered with the wavefront to be measured and then combined with the dispersed reference signal. The frequency shifting of the AOM allows a single detector to collect the beams for signal processing to determine a measurement of the wavefront.

21 Claims, 6 Drawing Sheets

FIG. 1

X and Y Drive Frequencies for 15 x 15 Subaperture Beams

| Y \ X | 86.875 | 88.87 | 90.625 | 92.5 | 94.375 | 96.25 | 98.125 | 100 | 101.875 | 103.75 | 105.625 | 107.5 | 109.375 | 111.25 | 113.125 |
|---|---|---|---|---|---|---|---|---|---|---|---|---|---|---|---|
| 114 | 200.875 | 202.750 | 204.625 | 206.500 | 208.375 | 210.250 | 212.125 | 214.000 | 215.875 | 217.750 | 219.625 | 221.500 | 223.375 | 225.250 | 227.125 |
| 112 | 198.875 | 200.750 | 202.625 | 204.500 | 206.375 | 208.250 | 210.125 | 212.000 | 213.875 | 215.750 | 217.625 | 219.500 | 221.375 | 223.250 | 225.125 |
| 110 | 196.875 | 198.750 | 200.625 | 202.500 | 204.375 | 206.250 | 208.125 | 210.000 | 211.875 | 213.750 | 215.625 | 217.500 | 219.375 | 221.250 | 223.125 |
| 108 | 194.875 | 196.750 | 198.625 | 200.500 | 202.375 | 204.250 | 206.125 | 208.000 | 209.875 | 211.750 | 213.625 | 215.500 | 217.375 | 219.250 | 221.125 |
| 106 | 192.875 | 194.750 | 196.625 | 198.500 | 200.375 | 202.250 | 204.125 | 206.000 | 207.875 | 209.750 | 211.625 | 213.500 | 215.375 | 217.250 | 219.125 |
| 104 | 190.875 | 192.750 | 194.625 | 196.500 | 198.375 | 200.250 | 202.125 | 204.000 | 205.875 | 207.750 | 209.625 | 211.500 | 213.375 | 215.250 | 217.125 |
| 102 | 188.875 | 190.750 | 192.625 | 194.500 | 196.375 | 198.250 | 200.125 | 202.000 | 203.875 | 205.750 | 207.625 | 209.500 | 211.375 | 213.250 | 215.125 |
| 100 | 186.875 | 188.750 | 190.625 | 192.500 | 194.375 | 196.250 | 198.125 | 200.000 | 201.875 | 203.750 | 205.625 | 207.500 | 209.375 | 211.250 | 213.125 |
| 98 | 184.875 | 186.750 | 188.625 | 190.500 | 192.375 | 194.250 | 196.125 | 198.000 | 199.875 | 201.750 | 203.625 | 205.500 | 207.375 | 209.250 | 211.125 |
| 96 | 182.875 | 184.750 | 186.625 | 188.500 | 190.375 | 192.250 | 194.125 | 196.000 | 197.875 | 199.750 | 201.625 | 203.500 | 205.375 | 207.250 | 209.125 |
| 94 | 180.875 | 182.750 | 184.625 | 186.500 | 188.375 | 190.250 | 192.125 | 194.000 | 195.875 | 197.750 | 199.625 | 201.500 | 203.375 | 205.250 | 207.125 |
| 92 | 178.875 | 180.750 | 182.625 | 184.500 | 186.375 | 188.250 | 190.125 | 192.000 | 193.875 | 195.750 | 197.625 | 199.500 | 201.375 | 203.250 | 205.125 |
| 90 | 176.875 | 178.750 | 180.625 | 182.500 | 184.375 | 186.250 | 188.125 | 190.000 | 191.875 | 193.750 | 195.625 | 197.500 | 199.375 | 201.250 | 203.125 |
| 88 | 174.875 | 176.750 | 178.625 | 180.500 | 182.375 | 184.250 | 186.125 | 188.000 | 189.875 | 191.750 | 193.625 | 195.500 | 197.375 | 199.250 | 201.125 |
| 86 | 172.875 | 174.750 | 176.625 | 178.500 | 180.375 | 182.250 | 184.125 | 186.000 | 187.875 | 189.750 | 191.625 | 193.500 | 195.375 | 197.250 | 199.125 |

Y Drive Frequency (MHz) — X Drive Frequency (MHz)

FREQUENCY MULTIPLEXED, MULTIPLE CHANNEL HETERODYNE INTERFEROMETER

BACKGROUND OF THE INVENTION

1. Field of the Invention

This invention relates to heterodyne interferometers. Particularly, this invention relates to heterodyne interferometers and their application to measuring wavefronts, such as in characterizing the optical aberrations of adaptive deformable mirrors or the wavefront piston induced by a vibrating mirror.

2. Description of the Related Art

In optical wireless communications there is a need to measure the distortions which may affect transmitted communication signals. For example, a signal transmitted between a satellite and a ground station may undergo distortion as consequence of being transmitted through the atmosphere. Measurements of a signal wavefront, such as an optical signal transmitted through the atmosphere, may be used to factor out the distortions that may occur in the transmission of a communications signal. Great pointing precision and overall communication efficiency can be achieved with more accurate and efficient measurements of such distortions.

There are several known non-heterodyne interferometry techniques for measuring optical characteristics or optical wavefronts. These typically include some form of image processing to identify interference fringes. In addition, there are slope detecting sensors, such as the Shack-Hartmann wavefront sensor or the shearing interferometer, for measuring the local tip and tilt of an optical element of a wavefront.

However, such non-heterodyne techniques typically have relatively slow acquisition and processing times which limit their usefulness in high bandwidth systems. The slope detecting techniques require substantial matrix computations to reconstruct optical path measurements, for example. This intensive processing can also increase the necessary processing time for such techniques.

In a similar manner, homodyne interferometers have been used to perform vibrometery measurements using relatively simple processing electronics. Also, single beam scanning heterodyne interferometers that use a single detector and electronic signal processor have been used. However, homodyne interferometers suffer from non-linearity effects at large vibration amplitudes, low signal-to-noise ratio caused by laser intensity fluctuations, and inverse frequency (i.e., 1/f) detector noise. Scanning interferometers use a single detector and electronic signal processor, but cannot simultaneously acquire vibration data from all locations on a device under test U.S. Pat. No. 6,972,846, by Lal et al., issued Dec. 6, 2005 discloses a multi-beam laser Doppler vibrometer that simultaneously measures velocity, displacement, and vibration history of multiple locations on an object. A beam of coherent light is split into an object beam and a reference beam. The object beam is divided into a plurality of object beams to simultaneously illuminate multiple locations on the object under inspection. The reference beam is frequency shifted and split into a corresponding plurality of frequency-shifted reference beams. A portion of each object beam is reflected by the object as a modulated object beam. The plurality of modulated object beams are collected and respectively mixed with the plurality of frequency-shifted reference beams to provide a plurality of beam pairs. Each beam pair may be focused onto a photodetector or an optical fiber connected to a photodetector.

However, U.S. Pat. No. 6,972,846 teaches of a vibrometer implementation that requires a diffractive optical element (DOE) to generate multiple object beams. Since all beams are encoded with the same heterodyne frequency, separate detectors and processing electronics are required for each object beam.

In view of the foregoing, there is a need in the art for systems and methods for efficiently measuring a wavefront of an optical signal. Similarly, there is a need for systems and methods for efficiently measuring object size and movement. Accordingly, there is a need for such systems and methods to functions with a minimal hardware elements. Particularly, there is a need for such systems and methods to measure an optical signal wavefront within minimal number of sensor components. These and other needs are met by the present invention as detailed hereafter.

SUMMARY OF THE INVENTION

Embodiments of the invention employ an acousto-optic modulator (AOM) as part of a heterodyne interferometer which measures optical path differences (OPD) between a test beam and a reference beam. An array of distinct frequencies are used to drive the AOM, yielding a spatially dispersed array of optical frequency-shifted subaperture beams of the test beam. The same array of distinct frequencies are also processed to generate a signal comprised of each of the shift frequencies of the subapertures. This signal provides the phase reference for the OPD calculation. The subaperture array of optical frequency-shifted beams of the test beam are phase modulated by the OPD of an element to be measured, and then optically combined with the dispersed reference beam. The combined beams from each subaperture interfere to produce a heterodyne beat frequency intensity modulation whose frequency is determined by the optical shift frequency of the test subaperture beam. The intensity modulation of the combined array of test and reference subaperture beams is detected by a photodetector. The intensity modulation signal is comprised of the sum of all the heterodyne beat frequencies of the subapertures. The measured OPD of each subaperture is determined by the phase difference between the beat frequency component of the photodiode intensity modulation signal and the corresponding frequency component of the phase reference signal. The unique frequency shifting of each of the test subaperture beams allows a single detector to collect the interfered beams for signal processing to determine a measurement of a measured element.

The measured element may be generally described as anything which can be captured as a disturbance creating OPDs in the spatially dispersed array of frequency-shifted subaperture beams of the test beam. Two exemplary embodiments are described, one measuring the wavefront of a test beam that is passed through a transmissive aberrating medium, and another measuring a vibrating object where the test beam is reflected off the vibrating object. Other embodiments employing other techniques for interacting the test beam with different elements may also be developed by those skilled in the art employing the underlying principle of the invention.

An exemplary embodiment of the invention comprises an apparatus for capturing measurement information including a beam splitter for splitting a laser beam into a reference beam and a test beam, an acousto-optic modulator (AOM) for spatially separating and modulating the test beam into a subaperture array of distinct frequency-shifted beams for applying across a measured element, the AOM driven by a drive frequency array of signal inputs, a beam expander for spatially dispersing the reference beam to at least match the subaperture array of the distinct frequency-shifted beams, a beam combiner for interfering the subaperture array of the distinct frequency-shifted beams applied to the measured element with the spatially dispersed reference beam, optics for directing the interfered subaperture array of the distinct frequency-shifted beams onto a detector, a photodetector for receiving the interfered subaperture array of the distinct frequency-shifted beams to produce an electrical signal representative of the measurement information from each subaperture of the measured element, and a processor for comparing an array of reference optical path differences derived from the array of signal inputs to the AOM and the electrical signal from the photodetector to determine the measurement information of the measured element.

In some embodiments, the drive frequency array may comprise a plurality of distinct frequencies. In one example, the drive frequency array is a two dimensional array, comprising a first range of drive frequencies and a second range of drive frequencies. To obtain the distinct frequencies, each of the plurality of distinct frequencies may comprise a sum of a first frequency from the first range and a second frequency from the second range. The first range of drive frequencies may be driven by a first signal source and the second range of drive frequencies are driven by a second signal source.

In further embodiments, the processor for determining the measurement information of the measured element may perform the operations of calculating a phase shift of each of the distinct frequency-shifted beams of the subaperture array and determining a corresponding optical path difference and determining in turn the measurement information of the measured element corresponding to a combination of the corresponding optical path difference across the subaperture array.

Embodiments of the invention include different specific measuring application. For example, the measured element may comprise an optical aberrating medium that the subaperture array of distinct frequency-shifted beams is directed across before being directed to the beam combiner. The measurement information of the aberrating medium may include a profile of the wavefront. In another example, the measured element may comprise a vibrating object that the subaperture array of distinct frequency-shifted beams are reflected off before being directed to the beam combiner. The measurement information of the vibrating object may include velocity, displacement, and vibration history across a surface of the vibrating object.

Similarly, a typical method embodiment of the invention for capturing measurement information may include the steps of splitting a laser beam into a reference beam and a test beam, spatially separating and modulating the test beam into a subaperture array of distinct frequency-shifted beams driven by a drive frequency array of signal inputs, applying the subaperture array of the distinct frequency-shifted beams across a measured element, spatially dispersing the reference beam to at least match the subaperture array of the distinct frequency-shifted beams, interfering the subaperture array of the distinct frequency-shifted beams with the spatially dispersed reference beam, directing the interfered subaperture array of the distinct frequency-shifted beams onto a photodetector to produce an electrical signal from the photodetector carrying the measurement information of the wavefront, and comparing an array of reference optical path differences derived from the array of signal inputs to the AOM and the electrical signal from the photodetector to determine the measurement information of the measured element. The method embodiment of the invention may be further modified consistent with system/apparatus embodiments described herein.

BRIEF DESCRIPTION OF THE DRAWINGS

Referring now to the drawings in which like reference numbers represent corresponding parts throughout:

FIG. 2A illustrates a exemplary drive frequency array which may be applied to a acousto-optical modulator (AOM) in an embodiment of the invention;

DETAILED DESCRIPTION OF THE PREFERRED EMBODIMENT

1. Overview

Various embodiments of the present invention employ the frequency shifting and beam steering properties of an AOM to perform both functions simultaneously. Also, the unique heterodyne frequency of each object beams allows a single detector to be used to detect multiple discrete heterodyne frequencies. Frequency multiplexing of multiple subaperture carriers onto one wide bandwidth channel requires signal processors to demultiplex each channel for subsequent OPD calculation. Recent advances in the size and processing power of FPGA and DSP chips makes this more economical. The added complication of the signal processing is offset by the simplicity and flexibility of the optics, modulators and detectors.

A heterodyne interferometer may be used for directly measuring the optical path difference between a test signal and a reference signal originating from a common beam of a laser. For example, the diameter of the beam is chosen so that wavefront tilt will be less than one wavelength of across the beam when measuring a wavefront. To measure larger optical distortions with greater wavefront tilt, it is necessary to divide the aperture of the interferometer into smaller subapertures such that the wavefront tilt is less than one wavelength of across each subaperture. Under this requirement, for most applications a large number of subapertures are required. In another example, the aperture may be divided to span the surface of a vibrating object to be measured. These two example applications are described in detail hereafter. It should be noted that although the later application may be described as a heterodyne vibrometer, this device is a specific application of a heterodyne interferometer. Both example embodiments are heterodyne interferometers.

Under a conventional approach, each subaperture requires individual imaging optics, photodetectors and processing electronics. The signal from each photodetector of each subaperture comprises a phase modulated carrier at the heterodyne frequency. Each subaperture requires identical electronics and signal processing to recover the optical path measurement from the detected carrier frequency. Since a separate copy of the optics and processing electronics are required for each subaperture, a reference flat wavefront is required to initially characterize the static phase offset in each processing channel.

In contrast to such a solution, embodiments of the invention use the inherent frequency shifting and beam steering property of a two dimensional acousto-optic modulator to generate an array of subaperture beams. Each subaperture beam obtains a unique frequency shift producing an identifiable heterodyne frequency when interfered with a common reference beam. A single detector can be used to collect the beams to produce an electrical signal comprising multiple radio frequency (RF) carriers, each corresponding to the heterodyne frequency of a particular subaperture.

This technique can substantially reduce the cost and complexity of a multiple subaperture heterodyne interferometer. There is also great flexibility in the design allowing simple tradeoffs between the number of subapertures, and the detection sensitivity and bandwidth of each subaperture. It is possible to completely reconfigure the system without changing or realigning any optics. Also, since a single optic and detector is used for all channels, there is no differential phase shift between subapertures eliminating the need for reference flat calibration.

The processing of such frequency multiplexed signals is very similar to the processing performed in software radio receivers. Those skilled in the art will appreciate that there are known techniques for implementing these functions with devices such as field programmable gate array (FPGA) chips or digital signal processors (DSPs).

2. Heterodyne Interferometer

As mentioned above, embodiments of the invention can utilize a two dimensional array of spatially dispersed subaperture beams in a heterodyne interferometer. (Embodiments of the invention also encompass a single dimensional array of spatially dispersed subaperture beams operating under the described principle as will be understood by those skilled in the art.) Each subaperture beam has a unique optical frequency shift. When the subaperture beams are interfered with the reference beam (spatially dispersed to match the array), each subaperture beam produces a unique heterodyne beat frequency at the photodetector. The OPD information from each subaperture can be determined by the phase shift of its unique heterodyne beat frequency relative to the reference frequency derived from the AOM drive signals. The multiple carrier frequencies can be detected simultaneously by a single optical detector.

Figure 1:
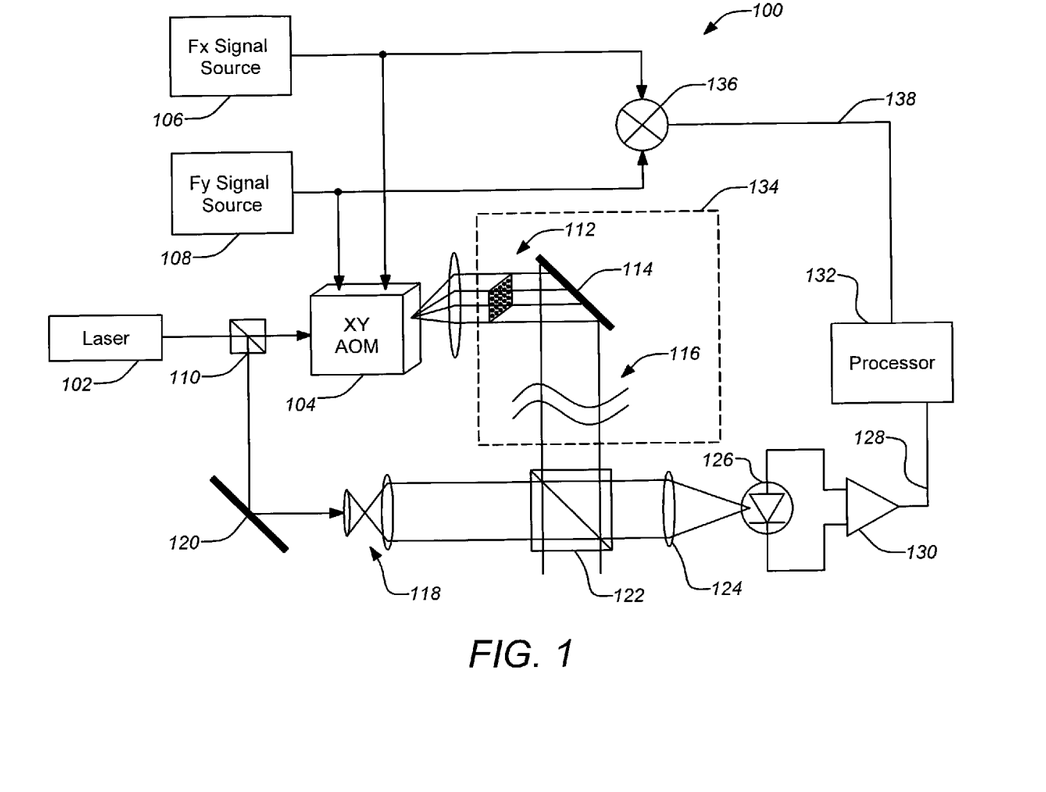
FIG. 1 illustrates an exemplary heterodyne interferometer embodiment of the invention for capturing wavefront measurement information.

FIG. 1 illustrates an exemplary heterodyne interferometer 100 embodiment of the invention for capturing wavefront information. A laser beam from the laser 102 is split into two paths, e.g. as in the legs of a Mach-Zender interferometer, by a beam splitter 110. The beam splitter 110 may comprise a half-silvered mirror or any other functionally suitable device. One path, carrying the test beam, is passed through an acousto-optic modulator (AOM) 104, e.g. such as a two dimensional acousto-optic modulator. The AOM is driven by an array of unique drive frequencies. For example, an Isomet model LS110-633XY which is driven by separate X and Y inputs, or a comparable device, may be used. The X input is driven by a radio frequency signal source 106 with multiple, equally spaced carriers. Similarly, the Y input is driven by another radio frequency signal source 108 with equally spaced carriers. The spacing of the X and Y carriers is selected so that the sum of each combination of X and Y carrier frequencies is unique.

In the interferometer 100, the AOM 104 provides both beam steering (deflection) and frequency shift functions. Although AOMs are more often used with a single drive frequency, they can also be used with complex drive signals comprised of a two dimensional array of frequencies. (In some applications, the AOM receives a single drive frequency to produce a single diffracted beam. This drive frequency may be amplitude modulated to control the intensity of the diffracted beam allowing it to be rapidly turned on and off faster than a mechanical shutter. In other applications, the frequency of the drive is modulated to control the angle of the diffracted beam allowing it to be scanned in angle more rapidly than possible using a galvanometer and mirror.) The angle of beam deflection along each axis is approximately proportional to the AOM drive frequency. In addition, the optical beam is also shifted in frequency by an amount equal to the AOM drive frequency. (Note: AOMs shift the frequency of the diffracted beam by an amount equal to the drive frequency.) Also, it should be noted that embodiments of the invention encompass an array of drive frequencies used with an AOM 104 that has only one input. Those skilled in the art will appreciate the same principle applied in a two dimensional spatial dispersion of the test beam is more simply applied in a one dimensional spatial dispersion of the test beam with an array of distinct drive frequencies applied to a single input AOM.

In an exemplary XY AOM 104, the output X and Y angular deflections of the beam are determined by the X and Y drive frequencies to the AOM, respectively. The frequency shift of the beam is determined by the sum of the X and Y AOM drive frequencies. See the exemplary X and Y drive frequency table of FIG. 2A. By careful selection of X and Y drive frequencies, it is possible to generate an array of diffracted subaperture beams with unique frequency shifts.

FIG. 2A illustrates a exemplary drive frequency array which may be applied to a two dimensional acousto-optical modulator (AOM) 104 in an embodiment of the invention. The table of FIG. 2A shows an example of the frequencies required to produce an array of 15×15 subaperture beams. All frequencies are shown in Megahertz. In this example, the X drive signal is comprised of fifteen carriers with a 1.875 MHz spacing centered at 100 MHz, and the Y drive signal is comprised of fifteen carriers with a 2 MHz spacing also centered at 100 MHz. This produces an output from the XY AOM 104 comprising an array 112 of beams which are spatially separate (e.g., in a rectangle) and frequency shifted, each to a unique frequency according to the selected inputs in the drive frequency array. Each of these beams can be considered to be a subaperture of the larger rectangular array 112 of the test beam.

For example, from the table it can be seen that the optical frequency shift for a lower left subaperture is 172.875 MHz resulting from the 86.875 MHz frequency shift from the X axis AOM plus the 86 MHz frequency shift from the Y axis AOM. The subaperture beam is "encoded" with the shift frequency because one can determine the signal from a particular subaperture by looking for its corresponding shift frequency in the photodiode signal. Although the AOM may introduce a constant phase offset, this offset will be the same for all subapertures. In this example, the carrier frequencies for the subapertures are separated by at least 125 Khz. This 125 Khz bandwidth for each subaperture carrier would allow for about 50 KHz of demodulated OPD signal with a typical resolution of $\lambda/1000$. This bandwidth would be sufficient for most atmospheric turbulence wavefront aberration sensing applications.

The subaperture array 112 of distinct frequency-shifted beams are then directed to an optical system 134 for applying them across a measured element (e.g., aberration source wavefront 116). The subaperture array 112 of distinct frequency-shifted beams continue along the test path of the interferometer, e.g. reflected off mirror 114, through the optical path of an aberration source wavefront 116 to be measured. This aberration source wavefront 116 introduces an optical path length difference (OPD) to each subaperture of the array 112. Note that although the aberration source wavefront 116 also introduces higher order distortion to the subaperture beams of the array 112, such as tip, tilt, focus, etc., the smaller size of the subapertures (compared to the overall array size) limits their susceptibility to the effects of these higher order distortions.

On the other leg of the interferometer 100, the reference beam from the beam splitter 110 is directed to a beam expander 118, e.g. by way of a mirror 120. The beam expander 118 disperses the reference beam to at least match the size of the subaperture array 112 of distinct frequency-shifted beams of the test beam. The distinct frequency-shifted beams of the array 112 are then optically interfered with the dispersed reference beam from the beam expander 118 of the interferometer 100. This can be performed with a beam combiner 122, e.g. such as a half-silvered mirror device, or any other known device suitable for combining the test array 112 of subapertures and the reference beam from the beam expander 118 in the interferometer 100. The output of the beam combiner 122 is the array 112 of subaperture beams each having a sinusoidal intensity modulation determined by a unique frequency shift of each beam. The phase shift of the sinusoidal intensity modulation is determined by the OPD due to the effect of the aberration source wavefront 116 in the test leg.

Since the resulting heterodyne frequency of each subaperture beam of the array 112 is unique, the beams can be combined by a focusing lens 124 onto a single photodetector 126. The electrical signal output 128 (e.g. through an amplifier 130) from the photodetector 126 comprises the sum of all the subaperture heterodyne signals of the array 112. Using signal processing techniques, the phase shift of each unique heterodyne carrier signal of the array 112 with respect to the phase reference signal derived from the AOM drive signals can be calculated in a processor 132. Since this electrical phase shift corresponds to optical path differences across the subaperture array 112, measurement information of the wavefront 116 across the array 112 of subapertures similarly corresponds to the determined phase shifts of each subaperture beam across the array 112. To derive the OPDs, the electrical signal output 128 must be compared to a reference electrical signal 138. In this example, the reference electrical signal 138 is produced by combining the array of unique drive frequencies from the signal sources 106, 108 in a radio frequency mixer 136. In the example, the reference electrical signal 138 includes all the distinct carrier frequencies shown in the table of FIG. 2A.

Figure 2B:
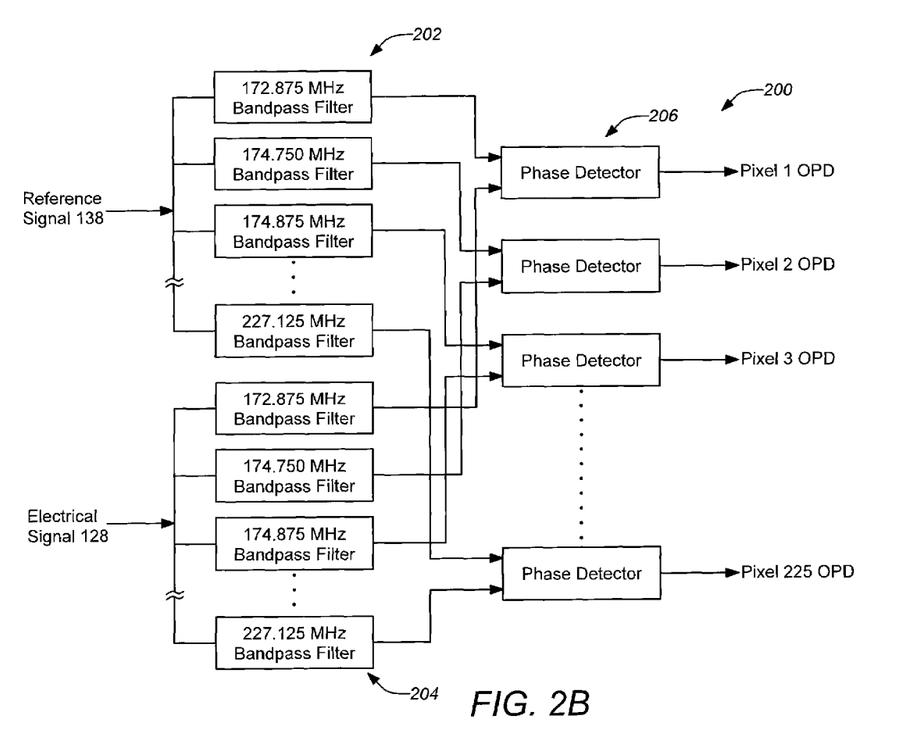
FIG. 2B is a block diagram of processing of the electrical signals in an exemplary embodiment of the invention to derive the measurement information of a measured element.

FIG. 2B is a block diagram 200 of processing of the electrical signals 128, 138 in an exemplary embodiment of the invention to derive the measurement information of the measured element. In the processor 132 the reference electrical signal 138 and the electrical signal output 128 of the interferometer 100 are each put into banks of bandpass filters 202, 204, respectively. The banks of bandpass filters, 202, 204, are tuned to isolate each of the carrier frequencies of the array of unique drive frequencies. The isolated outputs of the reference signal 138 and the electrical signal 128 at each frequency are each compared in separate phase detectors 206 to yield a signal which is demodulated to determine the OPD corresponding to each reference spatial location of the array.

As previously mentioned, embodiments of the invention are different than previous heterodyne interferometer implementations in that the previous implementations utilized multiple photodetectors (one for each subaperture) to detect a single heterodyne frequency. The phase of the heterodyne frequency from each detector would be demodulated to determine the OPD at each subaperture. However, embodiments of the present invention encode each subaperture with a unique heterodyne frequency so that a single detector can be used to detect multiple discrete heterodyne frequencies multiplexed together. Although frequency multiplexing of multiple subaperture carriers onto one wide bandwidth channel requires complex signal processors to demultiplex each channel for subsequent OPD calculation, recent advances in the size and processing power of FPGA and DSP chips makes this readily achievable as will be understood by those skilled in the art. The added complexity of the signal processing is offset by the simplicity and flexibility of the optics, modulators and detectors.

3. Heterodyne Vibrometer

As previously stated, the measured element with an embodiment of the invention may be generally described as anything which can be captured as a disturbance creating OPDs in the spatially dispersed array of frequency-shifted subaperture beams of the test beam. The embodiment of FIG. 1 can be used to measure a wavefront. In this section, an alternate embodiment for measuring a vibrating object is described. In both cases, the basic principle of operation is to use an AOM and array of unique carriers to efficiently capture and process measurement information.

Generally, a conventional heterodyne vibrometer is used for directly measuring velocity, displacement, and vibration history of an object. Multiple locations on a device under test can be measured simultaneously by splitting the single object beam from the interferometer into a plurality of object beams. These beams are used to illuminate a plurality of locations on the object under test. The reflected light from each object beam is collected and mixed with a frequency shifted reference beam. The resulting mixed beams are focused onto a plurality of photodetectors. The heterodyne signal from each photodetector can be used to determine the vibration at a single illuminated location on the device under test. For most applications, a large number of object beams and photodetectors are required to completely characterize the object under test.

The return object beam from each location on the object under test is Doppler shifted by the vibration of the device. Each of the plurality of object beams require separate optics, detectors, and signal processing electronics to recover the vibration measurement from the illuminated locations on the device under test. For multiple locations, the cost of the optics, detectors, and electronics can be significant.

In contrast, this embodiment of the invention uses the inherent frequency shifting and beam steering property of the two dimensional acousto-optic modulator to generate the array of object beams. Each object beam has a unique frequency shift producing an identifiable heterodyne frequency when interfered with a common reference beam. A single detector can be used to collect the beams to produce an electrical signal consisting of multiple radio frequency carriers, each corresponding to the heterodyne frequency from a particular location on the device under test. This technique substantially reduces the cost and complexity of a multiple beam heterodyne interferometer. There is also great flexibility in the design allowing easy tradeoffs between the number of beams, and the detection sensitivity and bandwidth of the plurality of object beams. In addition, it is possible to completely reconfigure the system without changing or realigning any optics.

Figure 3:
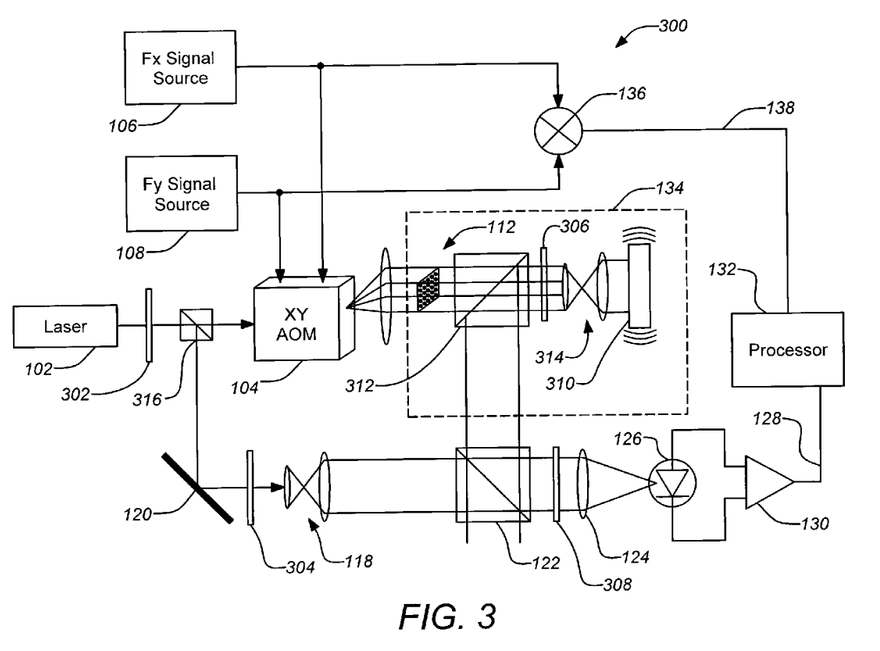
FIG. 3 illustrates an exemplary heterodyne vibrometer embodiment of the invention.

FIG. 3 illustrates an exemplary heterodyne vibrometer 300 embodiment of the invention. The principle of operation of the vibrometer 300 and many basic elements are identical to those of the interferometer 100 of FIG. 1 except that polarizing optics are used to minimize optical losses in the interferometer where noted. The most significant alteration is that in the vibrometer 300, the measured element comprises a vibrating object 310 instead of simply an optical wavefront. As before, each object beam has a unique optical frequency shift corresponding to its spatial location. To obtain interaction of the array 112 of beams with the vibrating object to induce OPDs, the optical system 134 for applying the array 112 of distinct frequency-shifted beams across the measured element comprises a polarizing beam splitter 312 for transmitting the array 112 of beams out and receiving their reflection back from the vibrating object 310 which receives the output from the AOM 104 from the first polarizing beamsplitter 316 that produces the test beam and the reference beam. Some additional optical elements, e.g. half wave plates 302, 304, quarter wave plate 306, imaging optics 314, and polarizer 308, are also introduced into the optical system of the vibrometer 300. It should be noted that similar modifying optical elements may also be employed in the interferometer 100 architecture as desired to tune and optimize performance as will be understood by those skilled in the art.

When the object beams of the array 112 are interfered with the reference beam (after being directed through the optical system 134), each resulting mixed beam produces a unique heterodyne beat frequency carrier at the photodetector 126. The Doppler shift, and hence the vibration from each reflected object beam can be determined from the frequency modulation of each unique heterodyne frequency carrier. Since each object beam location is determined by the heterodyne frequency carrier, multiple carrier frequencies and hence the vibration at multiple object locations can be detected simultaneously by a single optical detector.

A laser beam from the laser 102 is split into the two beams of a Mach-Zender interferometer, a test beam and a reference beam. The optical power in each beam can be controlled by rotating the polarization of the laser with the half wave plate 302 located in front of the first polarizing beam splitter 316. One leg passes through a two dimensional acousto-optic modulator (AOM), such as an Isomet model LS110-633XY.

The AOM drive frequencies may be developed in the same manner as the interferometer 100 of FIG. 1. Thus, the example table of frequencies of FIG. 2A is applicable to the vibrometer 300 as well. The X input may be driven by a radio frequency source with multiple, equally spaced carriers. The Y input may be driven by a similar radio frequency source with equally spaced carriers. The spacing of the X and Y carriers may be selected so that the sum of each combination of X and Y carrier frequencies is unique. In this example, the X drive signal is comprised of fifteen carriers with a 1.875 MHz spacing centered at 100 MHz, and the Y drive signal is comprised of fifteen carriers with a 2 MHz spacing also centered at 100 MHz. This produces an output from the XY AOM comprising a rectangular array of spatially separate, frequency shifted test beams.

In the vibrometer 300, this array 112 of test beams pass through the polarizing beam splitter 312 where they become circularly polarized after passing through a quarter wave plate 306. Imaging optics 314 may be used to focus the array 112 of test beams onto the vibrating object 310 under test. The scattered and reflected light from the test object 310 is then collected by the imaging optics 314 and becomes orthogonally polarized after passing back through the quarter wave plate 306. The returning array 112 of test beams are reflected by the polarizing beam splitter 312. The polarization of the reference beam is rotated by half wave plate 304 and dispersed by beam expander 118. The test beam is combined with the dispersed reference beam in the polarizing beam combiner 122. A 45° polarizer 308 allows the orthogonal polarizations of the test beams and reference beam to properly interfere on the photodetector 126. The array 112 of subaperture test beams are thus optically interfered with the single reference beam from the reference leg of the interferometer.

This produces a combined array of subaperture beams with sinusoidal intensity modulation determined by the unique frequency shift of each beam. The phase shift of the sinusoidal intensity modulation is determined by the OPD due to the Doppler shift occurring in the array 112 of test beams. Since the heterodyne frequency of each subaperture beam is unique, the beams can be combined by a focusing lens onto a single photodetector 126 without losing measurement information captured by each subaperture beam; the beams do not interfere with each other. The electrical signal 128 yielded from the photodetector 126 comprises of the sum of all the object beam heterodyne signals.

Using signal processing techniques, the frequency modulation of each unique heterodyne carrier signal in the electrical signal 128 of the photodetector 126 can be calculated. Processing performed by the processor 132 may be applied in the same manner previously described for block diagram of FIG. 2B to derive the measurement information of the measured element, i.e., the vibrating object 310 in this case. The reference electrical signal 138 is produced by combining the array of unique drive frequencies from the signal sources 106, 108 in a radio frequency mixer 136. Since the frequency modulation is caused by vibration induced Doppler shift of the test beams of the array 112, the vibration at each test beam location on the object 310 under test can be determined. This can be reduced from the derived OPDs at each location to reveal precise measurements of the position, velocity and vibration for the spatial position of each subaperture beam where it reflected of the vibrating object 310.

3. Method of Heterodyne Interferometry

Figure 4A:
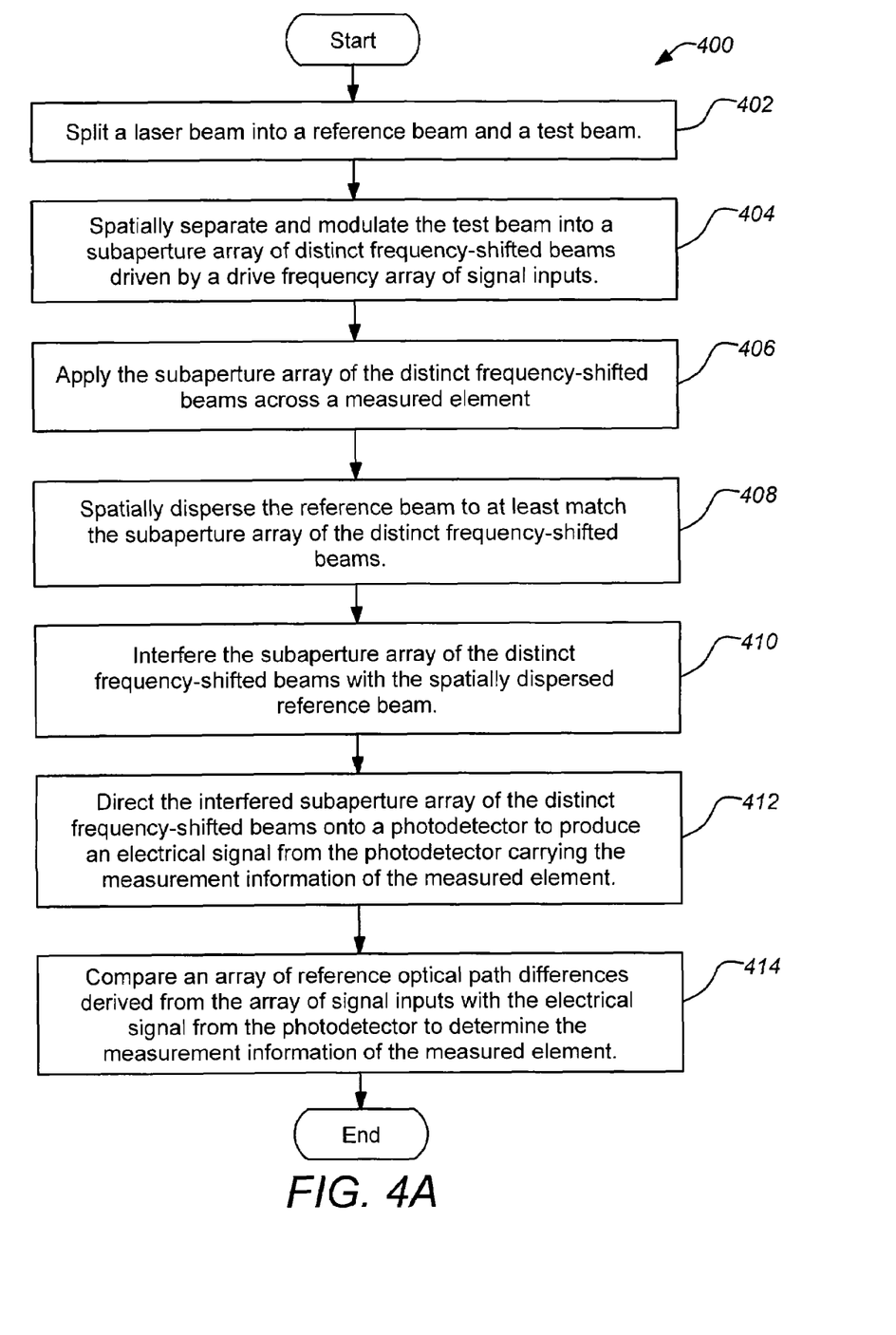
FIG. 4A is a flowchart of an exemplary method of the invention.

FIG. 4A is a flowchart of an exemplary method 400 of capturing wavefront information using heterodyne interferometry. The method 400 begins with an operation 402 of splitting a laser beam into a reference beam and a test beam. Next, in operation 404, the test beam is spatially separated and modulated into a subaperture array of distinct frequency-shifted beams driven by a drive frequency array of signal inputs. In operation 406, the subaperture array of the distinct frequency-shifted beams are applied across a measured element. In operation 408, the reference beam is spatially dispersed to at least match the subaperture array of the distinct frequency-shifted beams. The subaperture array of the distinct frequency-shifted beams is interfered with the spatially dispersed reference beam in operation 410. In operation 412, the interfered subaperture array of the distinct frequency-shifted beams is directed onto a photodetector to produce an electrical signal from the photodetector carrying the measurement information of the measured element. Finally, in operation 414, an array of reference optical path differences derived from the array of signal inputs is compared with the electrical signal from the photodetector to determine the measurement information of the measured element.

As previously mentioned, this method 400 may be applied with different techniques and systems for applying the subaperture array of the distinct frequency-shifted beams across different types of measured elements. In the two example embodiments, a measurement of a wavefront may be determined or a measurement of a vibrating object (e.g., velocity, displacement, and vibration history of the object).

Figure 4B:
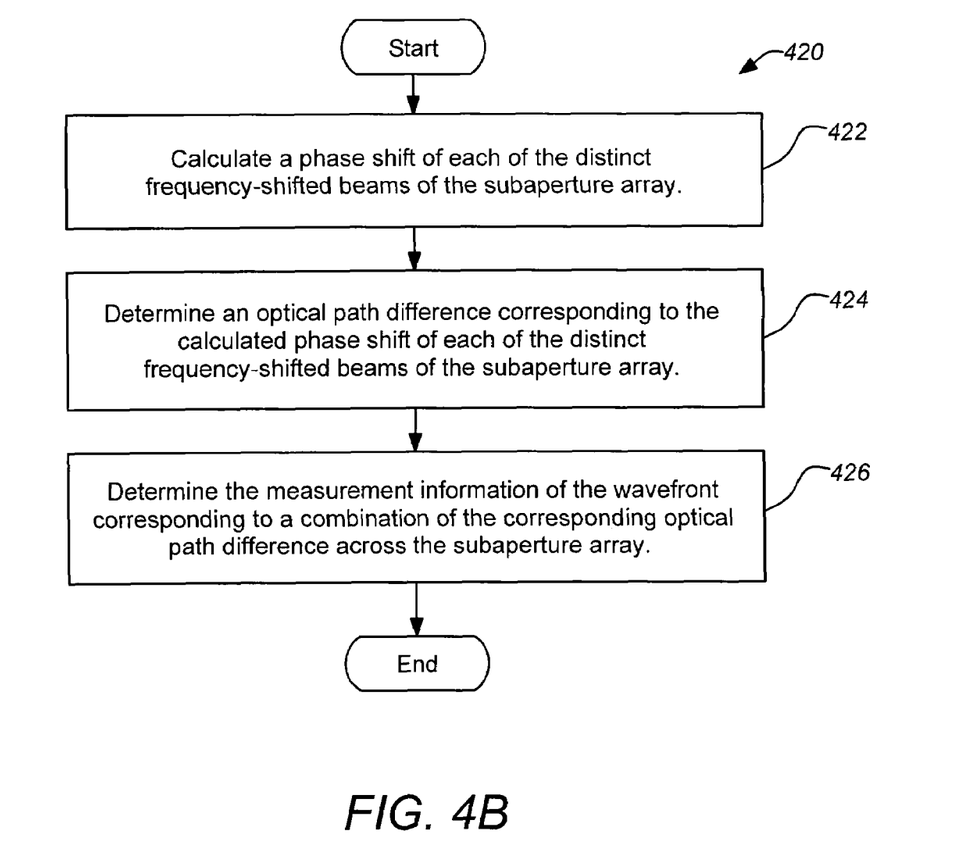
FIG. 4B is a flowchart of an exemplary method for processing the electrical signals to derive the actual measurement of the measured element.

FIG. 4B is a flowchart of an exemplary method 420 for processing the electrical signal to derive the actual measurement of the measured element (e.g., wavefront or vibrating object). A natural extension of the method 400 of capturing the measurement information of the measured element is to derive the actual measurement of the measured element. Thus, the method 400 may further include the method 420 beginning with the operation 422 of calculating a phase shift of the heterodyne signal from each of the distinct frequency-shifted beams of the subaperture array with respect to the corresponding reference signal. Next in operation 424, an optical path difference corresponding to the calculated phase shift of each of the distinct frequency-shifted beams of the subaperture array is determined. Finally, in operation 426 the measurement information of the measured element is determined corresponding to a combination of the corresponding optical path difference across the subaperture array. Detailed function of the required signal processing will be understood by those skilled in the art.

One possible method of determining the phase of each subaperture would be to generate the reference phase signal by electronically mixing the X and Y AOM drive frequencies. This mixing produces the sum and difference frequencies of each combination of X and Y drive frequencies. In this example, the difference frequencies range from 0.875 MHz to 27.125 MHz and the sum frequencies range from 172.875 MHz to 227.125 MHz. The difference frequencies can be easily filtered using a high pass filter. A pair of bandpass filters tuned to the frequency shift of each subaperture can be used to extract the phase reference signal from the sum of the AOM drive frequencies, and the corresponding phase modulated signal from the photodiode signal. Several possible techniques for measuring the relative phase between these two signals can be implemented as will be understood by those skilled in the art.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus for capturing measurement information, comprising:
    a beam splitter for splitting a laser beam into a reference beam and a test beam;
    an acousto-optic modulator (AOM) for spatially separating and modulating the test beam into a subaperture array of distinct frequency-shifted beams, each obtaining a unique frequency shift, for applying across a measured element, the AOM driven by a drive frequency array of signal inputs;
    a beam expander for spatially dispersing the reference beam to at least match the subaperture array of the distinct frequency-shifted beams;
    a beam combiner for interfering the subaperture array of the distinct frequency-shifted beams applied to the measured element with the spatially dispersed reference beam;
    optics for directing the interfered subaperture array of the distinct frequency-shifted beams;
    a photodetector for receiving the interfered subaperture array of the distinct frequency-shifted beams to produce an electrical signal from the photodetector carrying the measurement information of the measured element; and
    a processor for comparing an array of reference optical path differences derived from the array of signal inputs with the electrical signal from the photodetector to determine the measurement information of the measured element.

2. The apparatus of claim 1, wherein the drive frequency array comprises a plurality of distinct frequencies.

3. The apparatus of claim 2, wherein the drive frequency array comprises a first range of drive frequencies and a second range of drive frequencies.

4. The apparatus of claim 3, wherein each of the plurality of distinct frequencies comprises a sum of a first frequency from the first range and a second frequency from the second range.

5. The apparatus of claim 3, wherein the first range of drive frequencies are driven by a first signal source and the second range of drive frequencies are driven by a second signal source.

6. The apparatus of claim 1, the processor for determining the measurement information of the measured element comprises calculating a phase shift of each of the distinct frequency-shifted beams of the subaperture array and determining a corresponding optical path difference and determining in turn the measurement information of the measured element corresponding to a combination of the corresponding optical path difference across the subaperture array.

7. The apparatus of claim 1, wherein the measured element comprises a wavefront that the subaperture array of distinct frequency-shifted beams is directed across before being directed to the beam combiner.

8. The apparatus of claim 7, wherein the measurement information of the wavefront comprises a profile of the wavefront.

9. The apparatus of claim 1, wherein the measured element comprises a vibrating object that the subaperture array of distinct frequency-shifted beams are reflected off before being directed to the beam combiner.

10. The apparatus of claim 9, wherein the measurement information of the vibrating object comprises velocity, displacement, and vibration history across a surface of the vibrating object.

11. A method for capturing measurement information comprising the steps of:
    splitting a laser beam into a reference beam and a test beam;
    spatially separating and modulating the test beam into a subaperture array of distinct frequency-shifted beams, each obtaining a unique frequency shift, driven by a drive frequency array of signal inputs;
    applying the subaperture array of the distinct frequency-shifted beams across a measured element;
    spatially dispersing the reference beam to at least match the subaperture array of the distinct frequency-shifted beams;
    interfering the subaperture array of the distinct frequency-shifted beams with the spatially dispersed reference beam;
    directing the interfered subaperture array of the distinct frequency-shifted beams onto a photodetector to produce an electrical signal from the photodetector carrying the measurement information of the measured element; and
    comparing an array of reference optical path differences derived from the array of signal inputs with the electrical signal from the photodetector to determine the measurement information of the measured element.

12. The method of claim 11, wherein the drive frequency array comprises a plurality of distinct frequencies.

13. The method of claim 12, wherein the drive frequency array comprises a first range of drive frequencies and a second range of drive frequencies.

14. The method of claim 13, wherein each of the plurality of distinct frequencies comprises a sum of a first frequency from the first range and a second frequency from the second range.

15. The method of claim 13, wherein the first range of drive frequencies are driven by a first signal source and the second range of drive frequencies are driven by a second signal source.

16. The method of claim 11, the processor for determining the measurement information of the measured element comprises calculating a phase shift of each of the distinct frequency-shifted beams of the subaperture array and determining a corresponding optical path difference and determining in turn the measurement information of the measured element corresponding to a combination of the corresponding optical path difference across the subaperture array.

17. The method of claim 11, wherein the measured element comprises a wavefront that the subaperture array of distinct frequency-shifted beams is directed across before being directed to the beam combiner.

18. The method of claim 17, wherein the measurement information of the wavefront comprises a profile of the wavefront.

19. The method of claim 11, wherein the measured element comprises a vibrating object that the subaperture array of distinct frequency-shifted beams are reflected off before being directed to the beam combiner.

20. The method of claim 19, wherein the measurement information of the vibrating object comprises velocity, displacement, and vibration history across a surface of the vibrating object.

21. An apparatus for capturing measurement information comprising:
 a beam splitting means for splitting a laser beam into a reference beam and a test beam;
 a modulating means for spatially separating and modulating the test beam into a subaperture array of distinct frequency-shifted beams, each obtaining a unique frequency shift, applied across a measured element;
 a dispersing means for spatially dispersing the reference beam to at least match the subaperture array of the distinct frequency-shifted beams;
 a beam combiner means for interfering the subaperture array of the distinct frequency-shifted beams with the spatially dispersed reference beam;
 an optical means for directing the interfered subaperture array of the distinct frequency-shifted beams;
 a photodetecting means for receiving the interfered subaperture array of the distinct frequency-shifted beams to produce an electrical signal from the photodetecting means carrying the measurement information of the measured element; and
 a processor means for comparing an array of reference optical path differences derived from the array of signal inputs with the electrical signal from the photodetecting means to determine the measurement information of the measured element.

* * * * *